J. I. ARBOGAST.
MACHINE FOR PRODUCING HOLLOW GLASS ARTICLES.
APPLICATION FILED JAN. 3, 1910.
994,710.
Patented June 13, 1911.
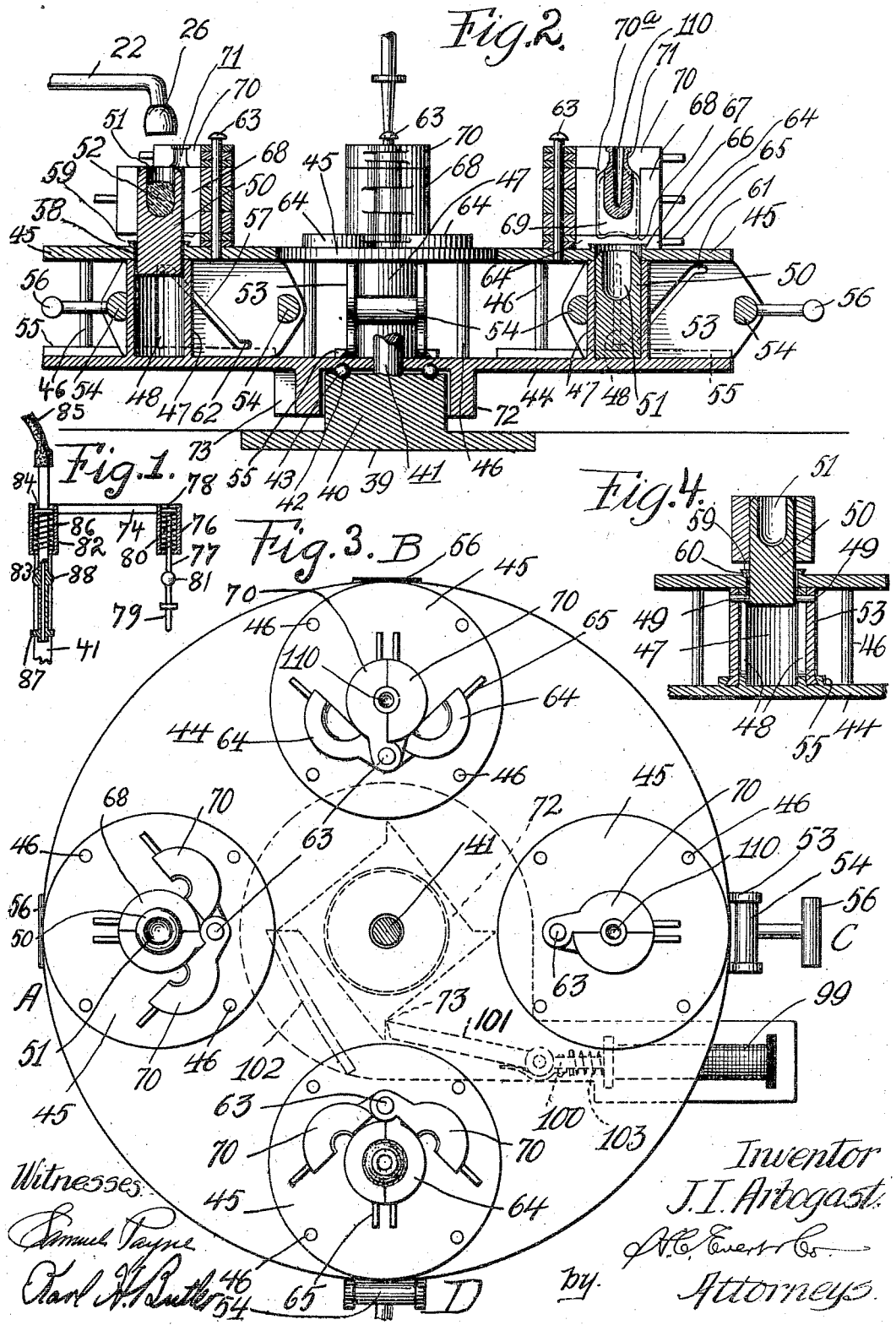
Witnesses
Inventor
J. I. Arbogast.
by
Attorneys.

UNITED STATES PATENT OFFICE.

JOHN I. ARBOGAST, OF PITTSBURG, PENNSYLVANIA, ASSIGNOR OF ONE-HALF TO HENRY L. COLLINS, OF PITTSBURG, PENNSYLVANIA.

MACHINE FOR PRODUCING HOLLOW GLASS ARTICLES.

994,710.  Specification of Letters Patent.  Patented June 13, 1911.

Application filed January 3, 1910. Serial No. 535,997.

*To all whom it may concern:*

Be it nown that I, JOHN I. ARBOGAST, a citizen of the United States of America, residing at S. S. Pittsburg, in the county of Allegheny and State of Pennsylvania, have invented certain new and useful Improvements in Machines for Producing Hollow Glass Articles, of which the following is a specification, reference being had therein to the accompanying drawing.

This invention relates to a machine for producing hollow glass articles, and the object of my invention is to provide in a manner as hereinafter set forth a machine by which the cost of producing hollow glass ware can be reduced to a minimum and more uniform ware or articles obtained.

Another object of this invention is to provide a novel machine for producing hollow glass articles by which the fluid capacity of hollow articles, as bottles, can be more accurately regulated.

A further object of the invention is to provide a machine for making hollow glass articles more expeditiously and with a greater degree of certainty as to the character of the articles produced than by machines heretofore devised and manually or automatically operated.

Reference will now be had to the drawings forming a part of this specification, wherein:—

Figure 1 is an enlarged vertical sectional view of a presser plunger adapted to form part of the machine, Fig. 2 is a vertical cross sectional view of the mold table or carrier, Fig. 3 is a plan of the same, and Fig. 4 is a vertical sectional view of the blank mold within a blow mold.

The machine is shown illustrated in connection with a suction pipe and head for conveying a batch of glass to the molds forming elements of the machine and the said suction pipe and head is conventionally shown and the pipe is indicated by the reference character 22 and the suction head by the reference character 26.

The floor or foundation upon which the machine is erected is provided with a counter-sunk base plate 39 having a central bearing 40 and a post 41. The upper face of the bearing 40 is provided with an annular ball race 42 for anti-friction balls 43, and revolubly mounted upon these balls is the carrier or table, comprising a circular horizontally disposed platform 44 and a plurality of super-imposed circular platforms 45, all of said super-imposed platforms being in the same horizontal plane and equally spaced apart. The super-imposed platforms, which are preferably four in number, are supported by posts 46 and by vertically extending cylindrical shells 47 disposed centrally with respect to the platforms 44 and 45 and carried by the platform 44. The shells 47 are provided with diametrically disposed vertical slots 48 and protruding through said slots are pins 49, carried by the side walls of blank molds 50 located in said shells, the pins 49 being arranged adjacent to the lower end of each mold. The upper end of each mold 50 is provided with a cavity 51 adapted to receive a quantity of molten glass 52 from the suction head 26. The blank molds 50 are adapted to be raised and lowered in the shells 47, and to accomplish such a movement of the blank molds, I utilize actuators, each comprising spaced vertical members 53 disposed upon opposite sides of the shells 47 between the platform 44 and the super-imposed platforms 45. The spaced members 53 are connected at their inner and outer ends by means of cross bars 54, and said members are adapted for a slidable movement between the platforms 44 and 45. The actuators are guided in their slidable movement by means of radially disposed parallel guides 55, carried by the platform 44. A handle 56 is connected to the outer bars 54 of said actuators, power being applied to these handles in effecting a movement of the actuators and the practical operation of the invention. The actuators may be operated manually by grasping the handle 56 or by means of any suitable power applied thereto, as found most suitable in the use of the invention. The members 53 are provided with inclined slots 57 constituting ways or guides for the extremities of the pins 49 which protrude through the vertical slots 48 of the shells 47. The actuators are adapted for a reciprocal movement in effecting the shifting of the blank molds 50, and when the molds are in their normal position, the pins 49 are at the lower ends of the slots 57. When a slidable or reciprocal movement is imparted to the actuators by the operation of the handle 56 or any other suitable power medium, the pins 49 are caused to move upwardly along the inclined ways or slots 57, thus actuating the blank molds to impart a vertical movement thereto, said molds being guided in their vertical movement by the vertical slots 48 in the shells 47. The aforesaid vertical movement of the blank molds is adapted to project the same upwardly through central openings 58 provided therefor in the super-imposed platforms 45, these openings having their upper edges surrounded by collars 59 formed integral with the platforms 45. The outer edges of the collars 59 are beveled, as at 60 for a purpose that will presently appear. In order to hold the blank molds at the limit of their upward movement, each of the slots or guide ways 57 merge at their upper ends into a horizontal seat 61, and the pins 49 rest in the seats 61 after the blank molds have been elevated. The lower ends of the slots or guide ways 57 also merge into horizontal seat 62 adapted to receive the pins 49 and retain the blank molds in a lowered position.

Upon each of the super-imposed platforms 45 is mounted a sectional bottom plate, a sectional blow mold and a sectional neck ring, these elements being arranged one above the other and pivotally connected to a post 63 at the side of the collar 59. The bottom plate which rests upon the platform 45 comprises two sections 64, each provided with a handle 65 and with a semi-circular recess 66 adapted to provide clearance for the collar 59 when the sections of the bottom plate are closed over the collar 59 and the opening 58. The recess 66 of each bottom plate is so shaped as to inter-lock with the beveled edges of the collar 59 when in a closed position. The upper faces of the mold plate sections 64 are recessed, as at 67 to form a shaping cavity adapted to properly shape the bottom of a blank blown upon said mold plate. This shaping cavity is best shown in the right hand side of Fig. 2. Adapted to swing on to the mold plate are the sections 68 of a blow mold, said sections having the confronting faces thereof provided with molding recesses 69 adapted to shape the blank blown in said blow mold. Adapted to swing over the blow mold are the sections 70 of a neck ring, these sections having the confronting faces thereof recessed, as at 71 to receive the upper end of the gathered glass 52 and hold the same during the pressing or blowing operation. Of course recesses 67, 69 and 71 will be shaped to conform to the hollow glass article to be produced by the machine. The sections 70 of the neck ring are loosely mounted upon the post 63, whereby said sections can be raised and lowered, such movement being necessary in order that depending breast-pieces 70ᵃ, carried by the sections 70 can be inserted and withdrawn from the blow mold.

The platform 44 is provided with a central depending circular flange 72 adapted to surround the bearing 40 and prevent accidental displacement of the platform 44 relatively to said bearing. The outer walls of the flange 72 are provided with ratchet teeth 73, preferably four in number, adapted to coöperate with the mechanism employed for intermittently moving the carrier or table.

The upper end of the post 41 is provided with two fixed radially disposed arms 74 and 75 disposed at right angles to one another. The outer end of the arm 74 is provided with a cylindrical housing 76 for the upper end of a presser plunger 77, the upper end of said plunger having a head 78 while the lower end thereof is provided with a forming head 79. Encircling the plunger 77 within the housing 76 is a coiled retracting spring 80 which is interposed between the lower end of the housing 76 and the head 78 to normally maintain the presser head in an elevated position. The plunger intermediate the ends thereof is provided with a suitable knob or handle 81, which can be easily gripped when it is desired to manually lower the plunger 77.

The outer end of the arm 75 is provided with a housing 82 for the upper end of a blow pipe nozzle 83. The nozzle 83 has the upper end thereof provided with a coupling piece 84 adapted to be connected to a flexible air supply pipe 85. Arranged within the housing 82 and encircling the nozzle 83 between the coupling piece 84 and the bottom of said housing is a coiled retracting spring 86 adapted to normally maintain the blow pipe in an elevated position. The lower end of the nozzle is provided with a collar 87 adapted to limit the movement of the lower end of said pipe when entering a pre-pressed blank to blow the blank to a finished form. The nozzle intermediate the ends thereof is enlarged to provide a hand grip 88. Suitable power other than hand power can be employed for lowering the plunger 77 and the nozzle 83.

The mechanism for shifting the platform 44 is as follows: A solenoid 99 is located adjacent to the base plate 39, and the core 100 thereof is provided with a spring pressed pawl 101 adapted to engage the ratchet teeth 73 and move the platform 44. The pawl 101 is guided in its forward movement by a rib 102, and said pawl and the core are restored to their normal position by a retractile spring 103.

With the bottom plate open, the sectional blow mold closed, the blank mold raised in the blow mold, and the neck ring in an open position, as shown at station A of Fig. 3, the gathering of glass is deposited in the blank mold. One of the operators located at either the station B, C or D then causes the solenoid 99 to be energized whereby the platform 44 will be revolved a quarter of a revolution, thus placing the gathered glass at the station B. The operator at this station closes the neck ring and then lowers the arms 74 and 75, whereby the presser plunger 77, carried by the arm 74 will be lowered, causing the forming head 79 to enter the gathered glass within the blank mold 50 and provide a blank with a cavity 110. When the forming head 79 enters the gathered glass, a portion of the glass is forced upwardly into the neck ring, which holds the pre-pressed blank while further operations are performed. The operator at station B then withdraws the blank mold from the blow mold. The platform 44 is revolved another quarter of a revolution to place the pre-pressed blank at the station C. The operator at this station closes the bottom plate and lowers the arms 74 and 75, whereby the nozzle 83 will enter the cavity 110 and the supply of air passing through the nozzle is adapted to blow the pre-pressed blank to a shape confined within the blow mold. After the pre-pressed blank has been blown, the operator can then open the neck ring. The platform is then revolved another quarter of a revolution and the blown article is transferred to station D, where the operator located at this station opens the neck ring, if it has not been previously performed at station C, opens the blow mold, removes the blown article, opens the bottom plate, closes the blow mold, and then elevates the blank mold into the blow mold, whereby when the table is revolved another quarter of a revolution, the blow mold containing the blank mold will be in position at station A to receive a gathering of glass.

From the foregoing it will be observed that the lowering of the arms 74 and 75 can be timed, whereby when a blank is being pre-pressed at the station B a pre-pressed blank can be blown at the station C. Furthermore it is apparent that these steps taken in connection with the carrier or mold table that simultaneously with the depositing of a suitable gathering of glass in the blank mold at station A, that the above mentioned operations can be performed and the operation of re-arranging the molds and removing the article performed at station D.

What I claim as new is:—

1. A machine for molding glass articles comprising a rotatable support, a plurality of platforms mounted thereon and each provided with a centrally-disposed opening, a vertically-disposed slotted shell interposed between the support and each of the platforms and each communicating with an opening, vertically-movable blank-receiving molds mounted in said shells and adapted to be shifted through said openings to receive batches of glass, lugs carried by the blank receiving molds and projecting through the slots of the shell reciprocatory means interposed between the platforms and support and engaging with the lugs for vertically moving the molds, and means to constitute sectional blow molds arranged upon the platforms and communicating with said openings.

2. A machine for molding glass articles comprising a rotatable support, a plurality of platforms mounted thereon and each provided with a centrally-disposed opening, vertically-disposed slotted shells interposed between the support and platforms and communicating with said openings, vertically-movable blank-receiving molds mounted in said shells and adapted to be shifted through said openings to receive batches of glass, lugs carried by the blank receiving molds and projecting through the slots of the shells, a guide arranged at each side of each shell and carried by the support, reciprocatory means interposed between the platforms and support and engaging with the lugs for vertically moving the molds, said reciprocatory means traveling in said guide, means to constitute sectional blow molds arranged upon the platforms and communicating with said openings, and means for transferring the batches from out of the blank molds to the blow molds.

3. A machine for molding glass articles comprising a rotatable support, a plurality of platforms mounted thereon and each provided with a centrally-disposed opening, vertically-disposed slotted shells interposed between the support and platforms and communicating with said openings, vertically-movable blank-receiving molds mounted in said shells and adapted to be shifted through said openings to receive batches of glass, lugs carried by the blank receiving molds and projecting through the slots of the shells, a guide arranged at each side of each shell and mounted upon said support, vertically-disposed shiftable members arranged in pairs and interposed between the platforms and support, and engaging with the lugs for vertically moving the molds, said members traveling in said guides, means for connecting the members of each pair together, means to constitute sectional blow molds arranged upon the platforms and communicating with said openings, means for transferring the batches from out of the blank molds to the blow molds, and means for blowing the batches within the blow molds to produce the articles.

4. A machine for molding glass articles comprising a rotatable support, a plurality of platforms mounted thereon and each provided with an opening, means for connecting the platforms to the support, a hollow cylindrical member interposed between each platform and the support and provided with a pair of oppositely-disposed vertically-extending slots, blank molds mounted in said members and adapted to be shifted through said openings to receive batches of glass, laterally-extending lugs carried by the blank molds and projecting through the slots of said members, slotted slidable members interposed between each platform and the support and engaging with the lugs of a blank mold for vertically moving the latter when the slidable members are shifted, pairs of guides carried by the support for said slidable members, and means to constitute sectional molds arranged above the platforms and communicating with said openings.

5. A machine for molding glass articles comprising a rotatable support, a plurality of platforms mounted thereon and each provided with an opening, means for connecting the platforms to the support, a hollow cylindrical member interposed between each platform and the support and provided with a pair of oppositely-disposed vertically-extending slots, blank molds mounted in said members and adapted to be shifted through said openings to receive batches of glass, laterally-extending lugs carried by the blank molds and projecting through the slots of said members, slotted slidable members interposed between each platform and the support and engaging with the lugs of a blank mold for vertically moving the latter when the slidable members are shifted, pairs of guides carried by the support for said slidable members, means to constitute sectional molds arranged above the platforms and communicating with said openings, and means for transferring the batches from the blank molds to the blow molds.

6. A machine for molding glass articles comprising a rotatable support, a plurality of platforms mounted thereon, and each provided with an opening, means for connecting the platforms to the support, a hollow cylindrical member interposed between each platform and the support and provided with a pair of oppositely-disposed vertically-extending slots, blank molds mounted in said members and adapted to be shifted through said openings to receive batches of glass, laterally-extending lugs carried by the blank molds and projecting through the slots of said members, slotted slidable members interposed between each platform and the support and engaging with the lugs of a blank mold for vertically moving the latter when the slidable members are shifted, pairs of guides carried by the support for said slidable members, means to constitute sectional molds arranged above the platforms and communicating with said openings, means for transferring the batches from the blank molds to the blow molds, a base for the support, a post carried by the base and projecting up through the support, means carried by the post for transferring the batches from the blank molds to the blow molds, and means supported by the post for blowing the batches within the blow molds to produce the article.

7. A machine for molding glass articles comprising a rotatable support, a base therefor, a post carried by the base and projecting through the support, a plurality of separate platforms mounted upon the support and each provided with a centrally-disposed opening, a vertically-disposed slotted shell interposed between each platform and the support communicating with an opening, vertically movable blank receiving molds mounted in said shells and adapted to be shifted through said openings to receive batches of glass, lugs carried by the blank receiving molds and projecting through the slots of the shell, reciprocatory means interposed between the platforms and support and engaging with the lugs for vertically moving the molds, means to constitute sectional blow molds arranged upon the platforms and communicating with said openings, means for intermittently rotating the support, means carried by the post for transferring the batches from the blank molds to the blow molds, and means carried by the post for blowing the batches within the blow molds to produce the articles.

In testimony whereof I affix my signature in the presence of two witnesses.

JOHN I. ARBOGAST.

Witnesses:
MAX H. SROLOVITZ,
KARL H. BUTLER.